United States Patent [19]
Kaschke

[11] Patent Number: 6,011,961
[45] Date of Patent: *Jan. 4, 2000

[54] KEYPAD APPARATUS WITH INTEGRAL DISPLAY INDICATORS

[75] Inventor: Kevin D. Kaschke, Schaumburg, Ill.

[73] Assignee: Motorola, Inc., Schauburg, Ill.

[ * ] Notice: This patent is subject to a terminal disclaimer.

[21] Appl. No.: 08/667,212

[22] Filed: Jun. 20, 1996

Related U.S. Application Data

[62] Division of application No. 08/297,436, Aug. 29, 1994, Pat. No. 5,555,550, which is a continuation of application No. 07/983,112, Nov. 30, 1992, abandoned, which is a continuation of application No. 07/591,185, Oct. 1, 1990, abandoned.

[51] Int. Cl.[7] ............................................. H04M 1/22
[52] U.S. Cl. .............................................. 455/90
[58] Field of Search ............................ 379/58, 59, 63, 379/164, 368, 369, 428, 429, 433, 451; 455/89, 90, 403, 550, 560, 575; 200/5 E, 341; 341/22, 28; 234/124; 345/168, 170; 364/189, 709.12; 434/228

[56] References Cited

U.S. PATENT DOCUMENTS

| | | | |
|---|---|---|---|
| 4,056,696 | 11/1977 | Meyerle et al. | 379/58 |
| 4,142,312 | 3/1979 | Stokes | 379/58 |
| 4,149,041 | 4/1979 | Card et al. | 379/368 |
| 4,349,705 | 9/1982 | Kuhfus | 379/368 |
| 4,374,308 | 2/1983 | Holesha | 379/164 |
| 4,636,593 | 1/1987 | Novak et al. | 200/5 A |
| 4,916,262 | 4/1990 | Jungels-Butler | 200/5 A |
| 5,555,550 | 9/1996 | Kaschke | 379/59 |

FOREIGN PATENT DOCUMENTS 0323916  12/1989  European Pat. Off. .

*Primary Examiner*—Dwayne D. Bost
*Assistant Examiner*—Nay Maung
*Attorney, Agent, or Firm*—Kevin D. Kaschke

[57] ABSTRACT

A keypad apparatus (100) with integral display indicator bars (102–104) provides input to a device while displaying the status of the device on the display indicator bars (102–104). The apparatus is comprised of a matrix of data input keys (101). The indicator bars (102–104) are coupled to the matrix of keys (101), the apparatus (100) being manufactured as a single unit. Both the data input keys (101) and the indicator bars (102–104) are comprised of substantially the same material; a flexible and translucent silicone material. This material enables the keypad apparatus, that is backlit by the device, to diffuse the light, thereby lighting the data keys. Each indicator bar (102–104) has an individual backlight (108) from the device, allowing a particular indicator bar to be lit individually.

8 Claims, 3 Drawing Sheets

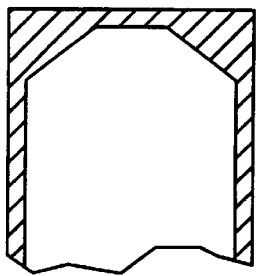
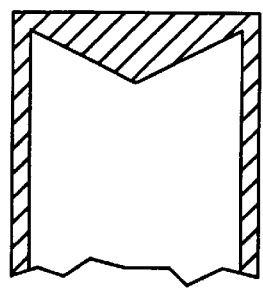
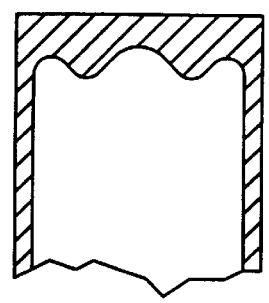
FIG.2A      FIG.2B      FIG.2C
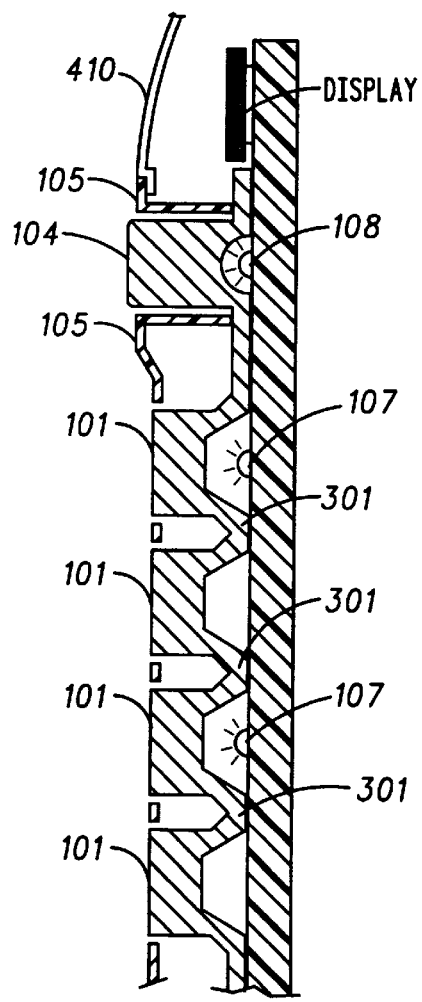
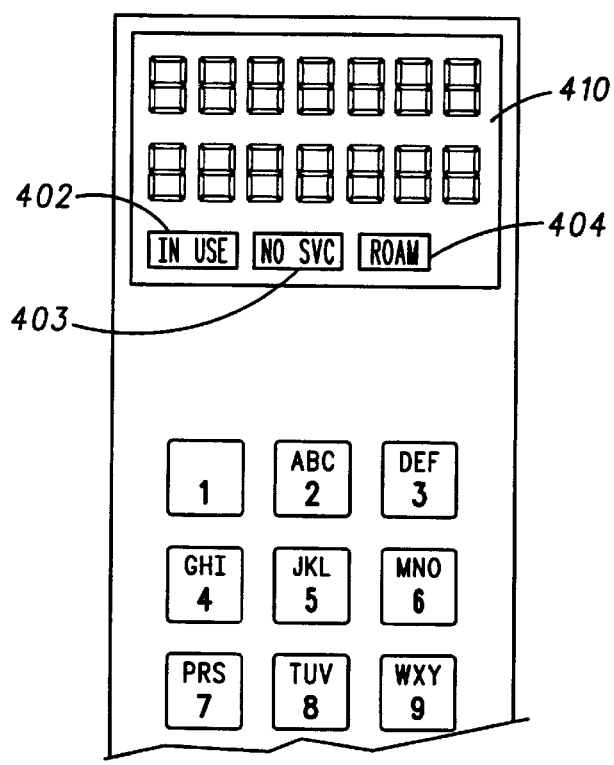
FIG.3      FIG.4

KEYPAD APPARATUS WITH INTEGRAL DISPLAY INDICATORS

This is a division of application Ser. No. 08/297,436 filed on Aug. 29, 1994, now U.S. Pat. No. 5,555,550 which is a continuation of Ser. No. 07/983,112 filed on Nov. 30, 1992 now abandoned, which is a continuation of Ser. No. 07/591,185 filed Oct. 1, 1990 now abandoned.

FIELD OF THE INVENTION

The present invention relates generally to the field of indicators.

BACKGROUND OF THE INVENTION

Light emitting diode (LED) light bars are typically used to indicate the status of a communications device, such as a radiotelephone. This status can include power indication, whether the communications device is electronically locked, and whether the device is in use.

These LED light bars are relatively expensive and require manual placement and soldering during the manufacturing process. Additionally, each label for the indicator lights must be silk screened on the communication device's lens since the light bar cannot be screened. This can add expense when a manufacturer has various models of approximately the same design and only the indicator labels vary. The manufacturer must make a different display lens for each model. There is a resulting need for an indicator that is less expensive to purchase and requires less labor to incorporate into a device.

SUMMARY OF THE INVENTION

A keypad apparatus with integral display indicator bars of the present invention provides input to a device while displaying the status of the device on the display indicator bars. The apparatus is comprised of a matrix of data input keys. Each key in a row is coupled to the key next to it in the row and each key in a column is coupled to the key next to it in the column. The indicator bars are coupled to the matrix of keys, the present invention being manufactured as a single unit. Both the data input keys and the indicator bars are comprised of substantially the same material; a flexible and translucent silicone material. This material enables the keypad apparatus, that is backlit by the device, to diffuse the light, thereby lighting the data keys. Each indicator bar has an individual backlight from the device, allowing each indicator bar to be lit individually, depending on the status indication desired.

BRIEF DESCRIPTION OF THE DRAWINGS

FIGS. 2A–2C shows different embodiments of varying the thickness of the key and indicator bar material.

FIG. 3 shows a side view of the present invention in a typical application in a cellular radiotelephone.

FIG. 4 shows an alternate embodiment of the present invention.

DETAILED DESCRIPTION OF THE PREFERRED EMBODIMENT

The keypad apparatus with integral display indicator bars of the present invention provides input to and status of a device, such as a radiotelephone. The device provides the general backlighting to light up the keypad and the specific lighting for illuminating the indicator bars, thus enabling operation of the apparatus in low or no light conditions.

Figure 1:
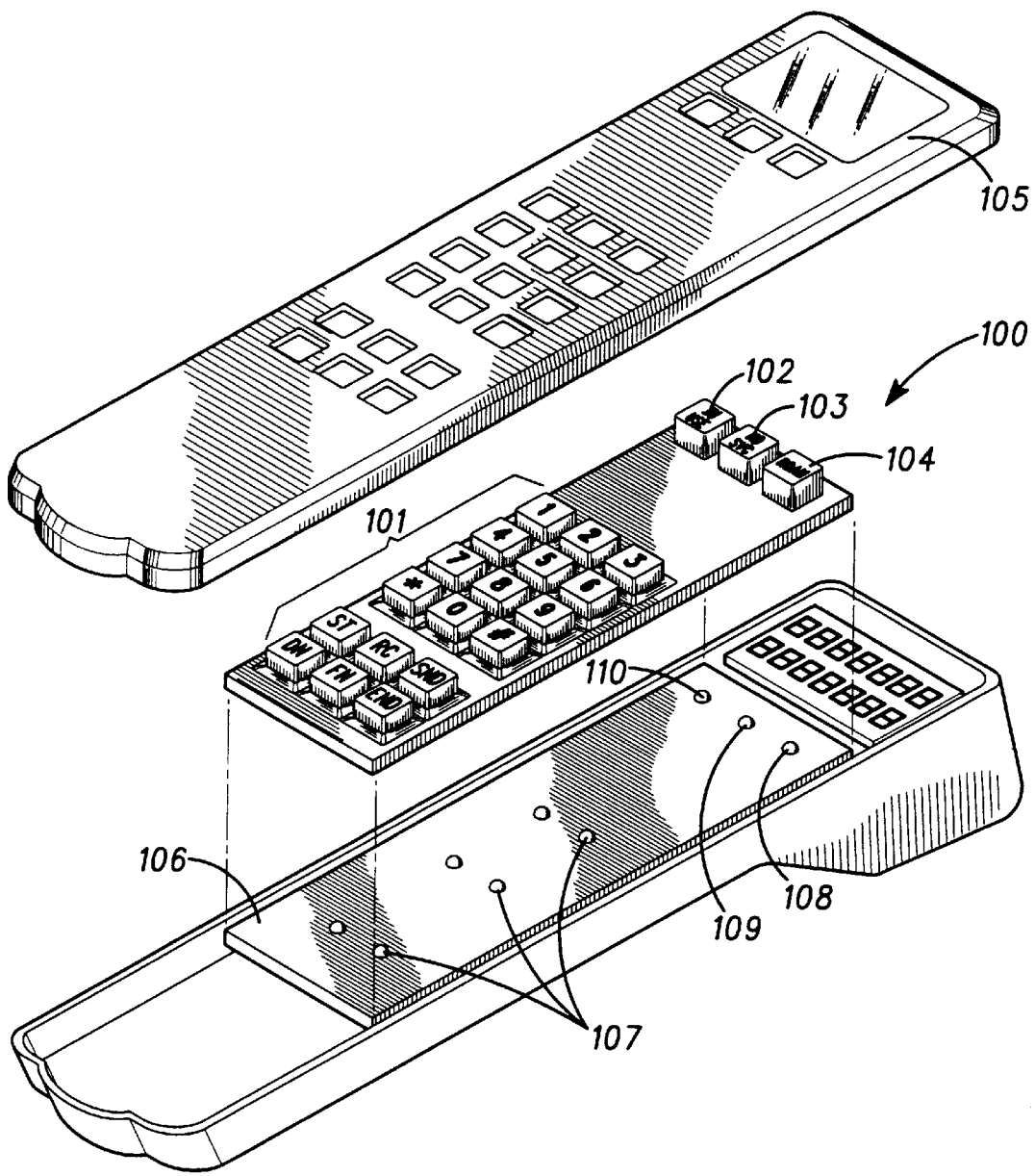
FIG. 1 shows the preferred embodiment of the keypad popple with integral display of the present invention used in a typical application in a cellular radiotelephone.

The apparatus, illustrated in FIG. 1, is comprised of a matrix of data input keys with at least one separate area of display indicator bars, the entire apparatus being manufactured as a single unit. Each key is coupled to the adjacent key by a leg (301), as illustrated in FIG. 3. This apparatus is typically referred to as a popple. In the preferred embodiment, the apparatus is comprised of a flexible, translucent, silicone material that internally diffuses backlighting provided by the device.

The thickness and density of the material determines the amount of light diffusion. Thicker material will diffuse and scatter more light than thinner material reducing the light that reaches the top of the indicator bar and therefore the indicator bars will not be lit as brightly. Different variations in thickness, illustrated FIGS. 2A–2C, result in different lighting patterns on the top surface of the indicator bar. This can be used to vary the intensity or evenness of the top surface of the indicator bar, depending on function or aesthetic appearance desired. An "IN USE" indicator bar, for example, can be made brighter than the rest of the indicators or data keys in order to make that indicator stand out from the rest. Additionally, making the indicator bar's top surface thinner in the middle, as illustrated in FIG. 2A, can be used to cause a hot spot on that indicator. LEDs and other light sources can have a narrow, broad or uneven illumination pattern. Varying the thickness of the tops of the indicators, as illustrated in FIGS. 2B and 2C, evens out the lighting by diffusing more light in some areas and less in others. The indicator illustrated in FIG. 2B, for example, is used for a light source having an illumination pattern that is stronger in the center than the sides. A similar scheme can be used for the data input keys.

The hardness of the indicator bars (102–104) can be increased to produce a different look and feel from the data input keys (101). This will make the indicator bars (102–104) less flexible and appear more solid than the data input keys (101). The appearance and diffusion characteristics of the indicator bars (102–104) can also be changed by adding more opaque silicone based material to the silicone. This has the effect of making the silicone less translucent and therefore reduces the amount of light reaching the top surface.

A typical application of the present invention in a radiotelephone is illustrated in FIG. 1. This figure shows the data input keys (101) of the present invention used as a telephone number input keypad with the associated radiotelephone control keys. The display indicator bars (102–104) are used to display the radiotelephone status. This status includes "NO SVC", "ROAM", and "IN USE".

Since the indicator bars are translucent, light meant for one indicator bar (104) can exit that indicator (104) and enter an adjacent one (103). This can cause problems if different colored light sources are used in each indicator bar (102–104) or if one indicator bar LED (108) is lit and the adjacent one (109) is not. In order to eliminate this leaking, the housing top (105) extends down around the four sides of the indicators (102–104), the indicator bars (102–104) are made flush with the printed circuit board (106), and the light source (108) has a narrow viewing angle. This is illustrated in FIG. 3.

The LEDs for backlighting (107 and 108–110) the present invention in the radiotelephone are located as illustrated in FIG. 2. The data input key LEDs (107) are located so that one LED lights approximately four keys. The indicator bars (102–104) have individual LEDs (108–110), each having a different color, allowing a particular indicator (102–104) to be lit when that status is active.

The labels or symbols for the data input keys (101) are silk screened on top of the key. The label or symbol screening for the indicator bars (102–104) depends on the embodiment of the present invention. If the preferred embodiment is used, the symbols are screened directly on the top of the indicator bars, in the same manner as the data input keys. This is illustrated in FIG. 1. In an alternate embodiment, illustrated in FIG. 4, the indicator bars (402–404) are under the display lens (410). In this case, the symbols representing the status are screened on the lens (410) over the indicator bar (402–404) representing that status.

Figure 5:
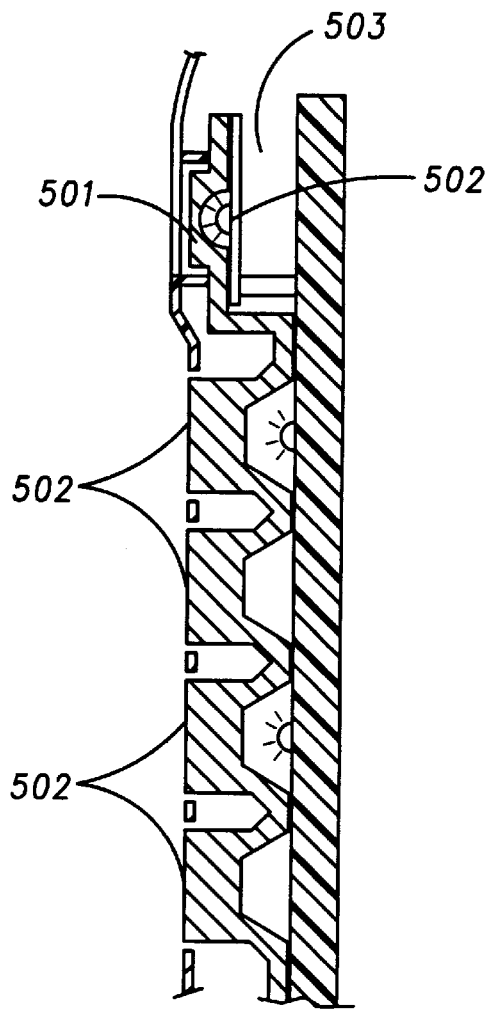
FIG. 5 shows another alternate embodiment of the present invention.

Another alternate embodiment of the present invention, illustrated in FIG. 5, mounts the indicator bars (501) in a different plane from the data input keys (502). This enables the indicator bars (501) to be mounted on a display module printed circuit board (503) where the specific LEDs (502) are located.

The present invention provides a number of benefits. The manufacturing of the present invention into a device is less expensive than prior art indicators. The LEDs, are surface mount components that are robotically placed on the printed circuit substrate. The present invention is placed in the housing top. The present invention, therefore, eliminates the hand placement and hand soldering of the prior art indicators.

The present invention is also less expensive than the prior art keypad and separate hardwired indicators. To combine the data input keys and indicators into one unit requires only a slightly larger mold, extra silicone material, and additional surface mount LEDs to light the indicators. The prior art apparatus requires separate, relatively expensive light bars.

In the preferred embodiment, the device is a cellular radiotelephone. The cellular radiotelephone comprises a transmitting means for transmitting cellular telephone calls, a receiving means for receiving cellular telephone calls, a display means for displaying radiotelephone data, and a keypad apparatus having a plurality of data keys for inputting radiotelephone data into the radiotelephone.

Figure 6:
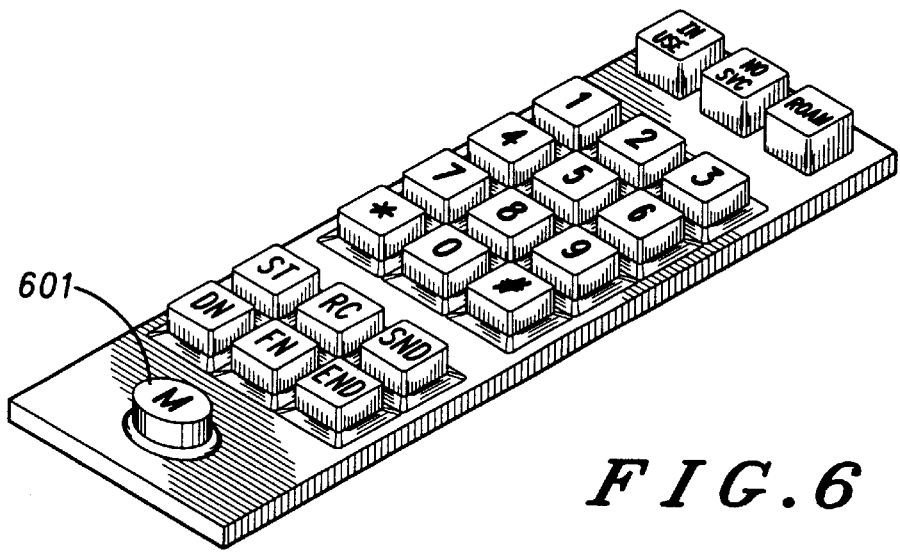
FIG. 6 shows yet another alternate embodiment of the present invention.

While the preferred embodiment of the present invention is used in a cellular radiotelephone, the present invention can be used in any device needing data input keys and indicator bars. These devices can include radios and landline telephones. The shape of the indicator bars is not limited to a rectangular shape; they can be formed in any shape required such as a circle or triangle. Additionally, the indicator bars can be used for other than status indication; an example of which being a company logo (601) as illustrated in FIG. 6. Instead of a company nameplate or silk screened company logo on the housing, a backlit company logo presents more appeal and makes the product easily identifiable at night.

In summary, a keypad apparatus having integral indicator bars has been shown. This apparatus can be used to enter data into a device with the data input keys while showing the status of the device with the indicator bars. If a manufacturer has multiple models that change only the key labels, the device housing for each model remains the same and only the labels on the present invention change. Thus, the present invention provides a material and labor cost advantage over conventional light bars.

I claim:

1. In a radiotelephone having radiotelephone circuitry operative to receive manually-generated input signals generated by way of a plurality of keypad pushbuttons integrally molded with a keypad, the keypad further having a surface positioned in tandem with a surface of the circuit board, a combination with the radiotelephone circuitry and the keypad of an assembly for visually indicating selected signals generated by the radiotelephone circuitry, said combination comprising:

at least one light-generating device coupled to the radiotelephone circuitry and disposed upon the surface of the circuit board, wherein the at least one light-generating device is operative to emit light responsive to a signal generated by the radiotelephone circuitry;

a sheet of translucent material integrally molded with the keypad, extending beyond an edge surface thereof and positioned above the at least one light-generating device when the keypad is positioned upon the surface of the circuit board; and at least one light-diffusing indicator integrally molded with the sheet of translucent material, the least one light-diffusing indicator extending beyond a top surface of the sheet of translucent material, wherein the least one light-diffusing indicator is positioned above corresponding ones of the least one light-generating device to diffuse light generated therefrom when the keypad is positioned upon the surface of the circuit board.

2. The combination of claim 1 wherein the keypad, the sheet of translucent material and the at least one light-diffusing indicator are comprised of a flexible, translucent, silicone material.

3. The combination of claim 1 further comprising:

a housing for housing the circuit board and for supporting the keypad and the sheet of translucent material in tandem with the surface of the circuit board.

4. The combination of claim 1:

wherein the keypad pushbuttons are flexibly coupled to the keypad by legs to permit each of the keypad pushbuttons to collapse against the surface of the circuit board upon actuation thereof; and wherein the at least one light-diffusing indicator is fixably coupled to the sheet of translucent material to permit the at least one light-diffusing indicator to be relatively immovable relative to the yielding movement of the keypad pushbuttons upon actuation thereof.

5. A user interface apparatus for a radiotelephone having radiotelephone circuitry operative to receive manually-generated input signals, and light-generating devices disposed on a surface of the circuit board for indicating a status of output signals generated by the radiotelephone circuitry, the user interface apparatus comprising:

a keypad formed of a flexible material and having integrally molded therewith a plurality of keypad pushbuttons positioned at spaced locations to form an array of keypad pushbuttons, wherein individual ones of the plurality of keypad pushbuttons produce the manually-generated input signals upon actuation of the individual ones of the plurality of keypad pushbuttons;

a sheet of translucent material integrally molded with the keypad, extending beyond an edge surface thereof and positioned above the plurality of light-generating devices when the keypad is positioned upon the surface of the circuit board; and a plurality of light-diffusing indicators integrally molded with the sheet of translucent material, each of the plurality of light-diffusing indicators extending beyond a top surface of the sheet of translucent material, wherein individual ones of the plurality of light-diffusing indicators are positioned above corresponding individual ones of the light-generating devices to diffuse light generated therefrom when the keypad is positioned upon the surface of the circuit board.

6. The user interface apparatus of claim 5:

wherein the keypad pushbuttons are flexibly coupled to the keypad by legs to permit each of the keypad pushbuttons to collapse against the surface of the circuit board upon actuation thereof; and wherein the at least one light-diffusing indicator is fixably coupled to the sheet of translucent material to permit the at least one light-diffusing indicator to be relatively immovable relative to the yielding movement of the keypad pushbuttons upon actuation thereof.

7. A radiotelephone comprising:

a circuit board;

radiotelephone circuitry operative to receive manually-generated input signals and to generate output signals;

a keypad formed of a flexible material and having integrally molded therewith a plurality of keypad pushbuttons positioned at spaced locations to form an array of keypad pushbuttons, wherein individual ones of the plurality of keypad pushbuttons produce the manually-generated input signals upon actuation of the individual ones of the plurality of keypad pushbuttons;

a plurality of light-generating devices, disposed on the surface of the circuit board, for generating light to indicate a status of the output signals;

a sheet of translucent material integrally molded with the keypad, extending beyond an edge surface thereof and positioned above the plurality of light-generating devices when the keypad is positioned upon the surface of the circuit board; and a plurality of light-diffusing indicators integrally molded with the sheet of translucent material, each of the plurality of light-diffusing indicators extending beyond a top surface of the sheet of translucent material, wherein individual ones of the plurality of light-diffusing indicators are positioned above corresponding ones of the light-generating devices to diffuse light generated therefrom when the keypad is positioned upon the surface of the circuit board.

8. The radiotelephone of claim 7:

wherein the keypad pushbuttons are flexibly coupled to the keypad by legs to permit each of the keypad pushbuttons to collapse against the surface of the circuit board upon actuation thereof; and wherein the at least one light-diffusing indicator is fixably coupled to the sheet of translucent material to permit the at least one light-diffusing indicator to be relatively immovable relative to the yielding movement of the keypad pushbuttons upon actuation thereof.

* * * * *